(12) United States Patent
Ho

(10) Patent No.: US 10,138,046 B2
(45) Date of Patent: Nov. 27, 2018

(54) NEGATIVE PRESSURE STORAGE CONTAINER

(71) Applicant: Shin Hung Yih Technology Co., Ltd., Taipei (TW)

(72) Inventor: Yi-Hung Ho, Taipei (TW)

(73) Assignee: Shin Hung Yih Technology Co., Ltd., Taipei (TW)

( * ) Notice: Subject to any disclaimer, the term of this patent is extended or adjusted under 35 U.S.C. 154(b) by 146 days.

(21) Appl. No.: 15/465,849

(22) Filed: Mar. 22, 2017

(65) Prior Publication Data
US 2018/0273274 A1  Sep. 27, 2018

(51) Int. Cl.
| | | |
|---|---|---|
| *B65D 81/20* | (2006.01) |
| *B65D 43/26* | (2006.01) |
| *B65D 45/02* | (2006.01) |
| *B65D 81/24* | (2006.01) |
| *B65D 79/00* | (2006.01) |
| *B65D 53/02* | (2006.01) |

(52) U.S. Cl.
CPC ......... *B65D 81/2038* (2013.01); *B65D 43/26* (2013.01); *B65D 45/02* (2013.01); *B65D 53/02* (2013.01); *B65D 79/00* (2013.01); *B65D 81/24* (2013.01); *B65D 2543/00018* (2013.01)

(58) Field of Classification Search
CPC ............ B65D 81/2007; B65D 81/2015; B65D 81/2038
USPC .......................................................... 141/165
See application file for complete search history.

(56) References Cited

U.S. PATENT DOCUMENTS

| | | | | |
|---|---|---|---|---|
| 5,201,348 A | * | 4/1993 | Lurz ...................... | B01D 61/18 141/130 |
| 5,546,997 A | * | 8/1996 | Miramon ............ | A47G 19/2272 141/64 |
| 5,651,470 A | * | 7/1997 | Wu .......................... | F16J 13/24 141/65 |
| 5,692,632 A | * | 12/1997 | Hsieh ..................... | B65D 81/20 215/228 |
| 5,806,575 A | * | 9/1998 | Tsay ................... | B65D 81/2015 141/192 |
| 6,470,924 B2 | * | 10/2002 | Chen ....................... | F04B 37/14 141/65 |
| 6,557,462 B1 | * | 5/2003 | Wang ..................... | A47J 47/10 219/732 |

(Continued)

FOREIGN PATENT DOCUMENTS

JP  WO 2005007524 A1 *  1/2005  .......... B65D 77/225

*Primary Examiner* — Timothy L Maust
(74) *Attorney, Agent, or Firm* — Jackson IPG PLLC; Demian K. Jackson

(57) ABSTRACT

A negative pressure storage container includes a container cover, a container body, a rotary device, a gear transmission mechanism and a vacuum pump so arranged that rotating the rotary device drives a driving gear of a transmission gear set of the gear transmission mechanism to rotate an eccentric wheel, causing a link to reciprocate a reciprocating piston of a vacuum pump in creating a negative pressure in the container body. When the negative pressure reaches a certain level, the bottom wall of a plastic inner cover member of the container cover is forced to curve and to carry the driving gear away from the rotary device; at this time, and thus, the rotary device runs idle at this time, preventing overloading the transmission gear set and prolonging the service life of the gear transmission mechanism.

11 Claims, 17 Drawing Sheets

(56) References Cited

U.S. PATENT DOCUMENTS

| | | | |
|---|---|---|---|
| 6,830,081 B1* | 12/2004 | Chen | B65D 81/2038 |
| | | | 141/65 |
| 6,994,227 B2* | 2/2006 | Kwon | A47J 47/10 |
| | | | 116/309 |
| 7,048,136 B2* | 5/2006 | Havens | B65D 51/1644 |
| | | | 206/524.8 |
| 7,721,771 B2* | 5/2010 | Tsay | B01J 3/03 |
| | | | 141/65 |
| 8,113,246 B2* | 2/2012 | Hsieh | B65D 81/2038 |
| | | | 141/197 |
| 9,296,542 B2* | 3/2016 | Ho | B65D 81/2038 |
| 9,914,271 B2* | 3/2018 | Spindler | B60S 5/04 |
| 2017/0190496 A1* | 7/2017 | Yang | B65D 43/02 |
| 2018/0009589 A1* | 1/2018 | Ho | B65D 21/0219 |

* cited by examiner

NEGATIVE PRESSURE STORAGE CONTAINER

BACKGROUND OF THE INVENTION

1. Field of the Invention

The present invention relates to storage container technology and more particularly, to a negative pressure storage container, which uses a rotary device to drive a vacuum pump in drawing air out of the container body, and the rotary device will run idle when a certain level of negative pressure is created in the container body, avoiding damage to the transmission gear set.

2. Description of the Related Art

U.S. Pat. No. 9,296,542, issued to the present inventor, discloses a vacuum storage container, which includes a container housing, a drawer mounted in the container housing and movable between a closed position and an open position, a rotary knob pivotally mounted in a door cover of the drawer, clockwork coupled to the rotary knob, a drive gear affixed to the rotary knob, a transmission gear set rotatable by the drive gear, an eccentric wheel rotatable by the transmission gear set, a pumping pump mounted in the drawer and coupled to the eccentric wheel for creating a vacuum in the container housing, an ejection mechanism adapted for ejecting the drawer out of the container housing, and an operating member control mechanism adapted for locking the drawer to the container housing and operable to unlock the drawer for enabling the drawer to be ejected out of the container housing by the ejection mechanism.

According to the aforesaid prior art mechanical type vacuum storage container, when the internal air of the container housing leaks out, the container housing cannot be automatically fills up with air. There are electronic type negative pressure storage containers commercially available. However, if the internal air of an electronic type negative pressure storage container leaks out, a vacuum pumping operation must be performed again, bringing inconvenience.

SUMMARY OF THE INVENTION

The present invention has been accomplished under the circumstances in view. It is therefore the main object of the present invention to provide a negative pressure storage container, which comprises a container cover, a container body, a rotary device, a gear transmission mechanism and a vacuum pump that are so configured that when the negative pressure created in the container body reaches a certain level, the bottom wall of the plastic inner cover member of the container cover is forced to curve in direction toward the inside of the container body, and thus, the transmission gear set of the gear transmission mechanism is moved with the deformed bottom wall of the inner cover member toward the inside of the container body to disengage the driving gear from the gear portion of the inner shaft of the rotary device; at this time, the rotary device runs idle and cannot drive the gear transmission mechanism to rotate, preventing overloading the transmission gear set and prolonging the service life of the gear transmission mechanism.

It is another object of the present invention to provide a negative pressure storage container, which is so configured that when a certain level of negative pressure is created in the container body, the storage food ingredients and eatable items in the container body can be maintained fresh.

It is still another object of the present invention to provide a negative pressure storage container, which is so configured that the relief valve rod comprises an internal passageway cutting through the opposing top and bottom ends thereof with a bottom end thereof disposed in communication with the bottom side of the relief channel of the inner cover member and a top end thereof fixedly mounted with a flexible end cap, thus, when a negative pressure is created in the container body, the flexible end cap is sucked by the negative pressure in the internal passageway to curve inwards, exhibiting a sign indicative of the presence of a negative pressure; the flexible end cap further comprises a top protruding portion located at the center of the top surface thereof and made of a different material with a different color relative to the flexible end cap, enhancing the negative pressure identification indication effect.

DETAILED DESCRIPTION OF THE INVENTION

Figure 1:
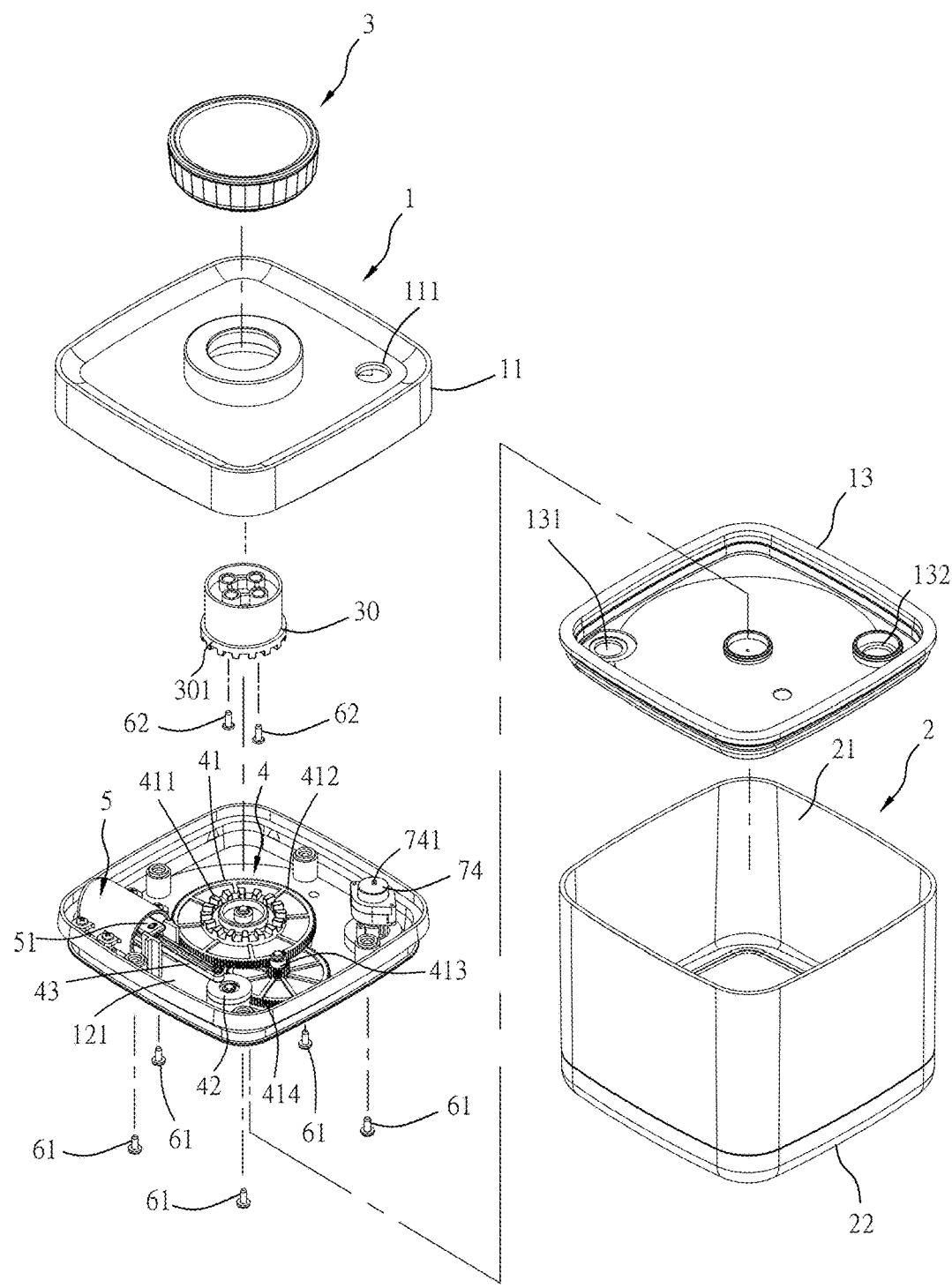
FIG. 1 is an exploded view of a negative pressure storage container in accordance with a first embodiment of the present invention.
Figure 2:
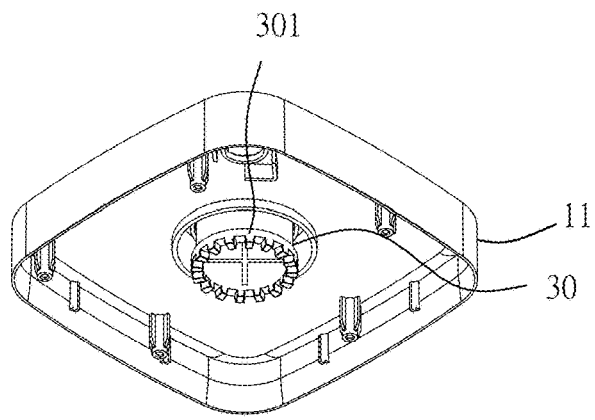
FIG. 2 is an oblique bottom elevational view of the assembly of the outer cover member and the rotary device.
Figure 3:
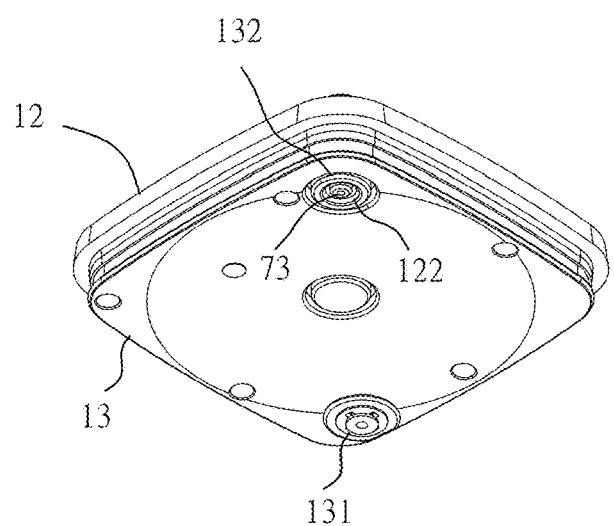
FIG. 3 is an oblique bottom elevational view of the assembly of the inner cover member and the inner plastic cushion member.
Figure 4:
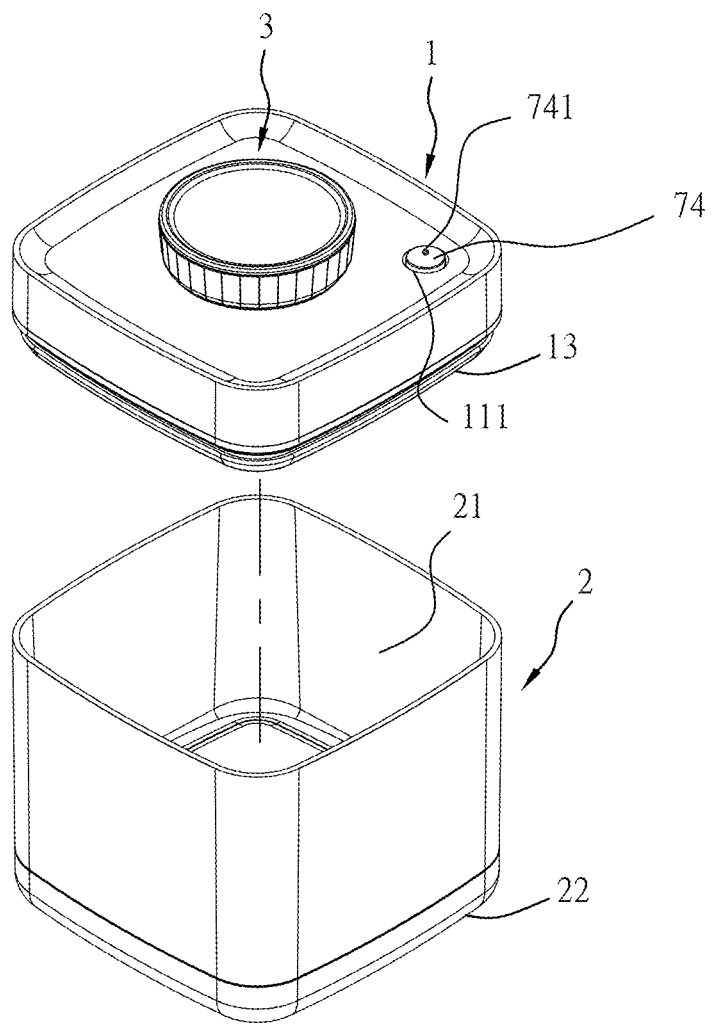
FIG. 4 is an exploded view of the container body and the container cover.
Figure 5:
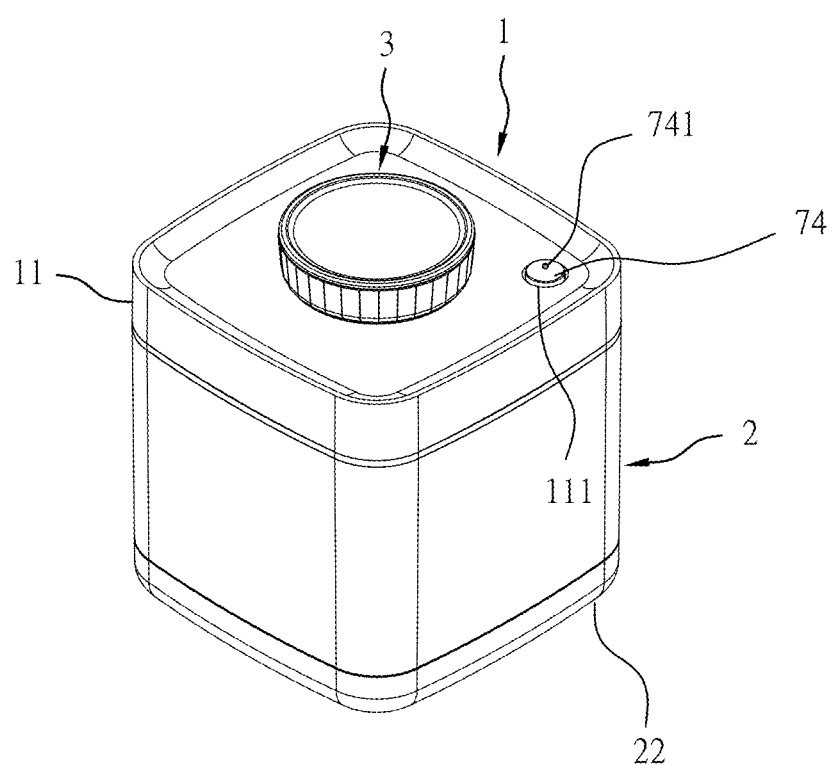
FIG. 5 is an oblique top elevational assembly view of the negative pressure storage container in accordance with the first embodiment of the present invention.

Referring to FIGS. 1-8, a negative pressure storage container in accordance with a first embodiment of the present invention is shown. The negative pressure storage container of this first embodiment comprises a container cover 1, a container body 2, a rotary device 3, a gear transmission mechanism 4, and a vacuum pump 5.

The container body 2 defines therein a storage chamber with an open side 21 for storing foods, having a bottom surface thereof mounted with an anti-slip pad 22.

The container cover 1 covers the container body 2, comprising an outer cover member 11, an inner cover member 12 and an inner plastic cushion member 13. The outer cover member 11 and the inner cover member 12 are fastened together by first fastening members 61 (see FIG. 1 and FIG. 6), or by means of grooves (not shown) and tenons (not shown). The inner cover member 12 is made of a plastic material, having a top side thereof fastened to the outer cover member 11 and an opposing bottom side thereof fastened to the inner plastic cushion member 13 (see FIG. 3 and FIGS. 10 and 11). Further, the inner cover member 12 has a suction hole 1211 located on a bottom wall 121 thereof (see FIG. 9). The inner plastic cushion member 13 has a suction through hole 131 (see FIG. 1 and FIG. 9) corresponding to the suction hole 1211. After covered the container cover 1 on the container body 2, the suction hole 1211 is kept in communication with the inside space of the container body 2.

Figure 6:
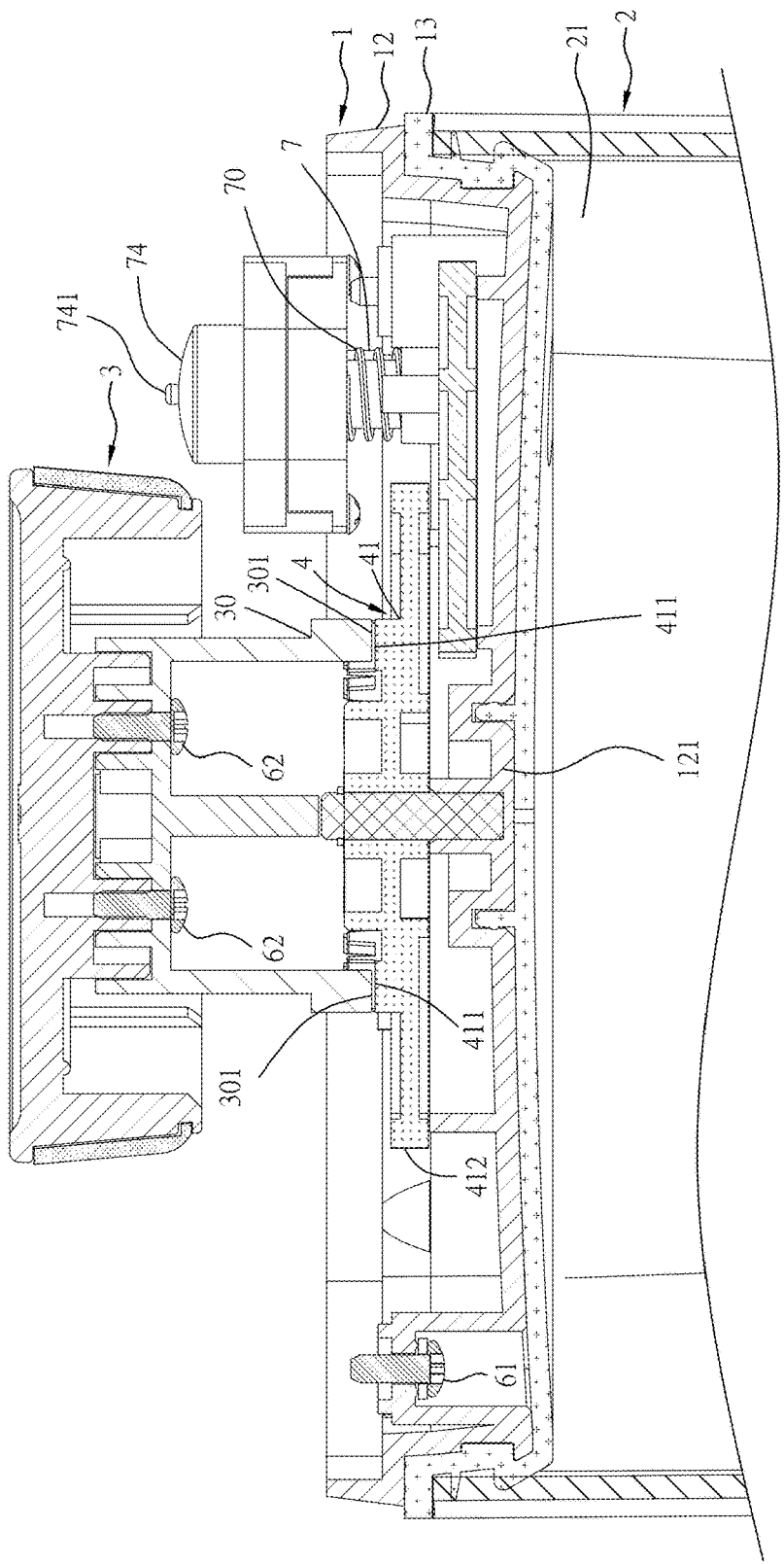
FIG. 6 is a sectional view, in an enlarged scale, of the negative pressure storage container in accordance with the first embodiment of the present invention.
Figure 7:
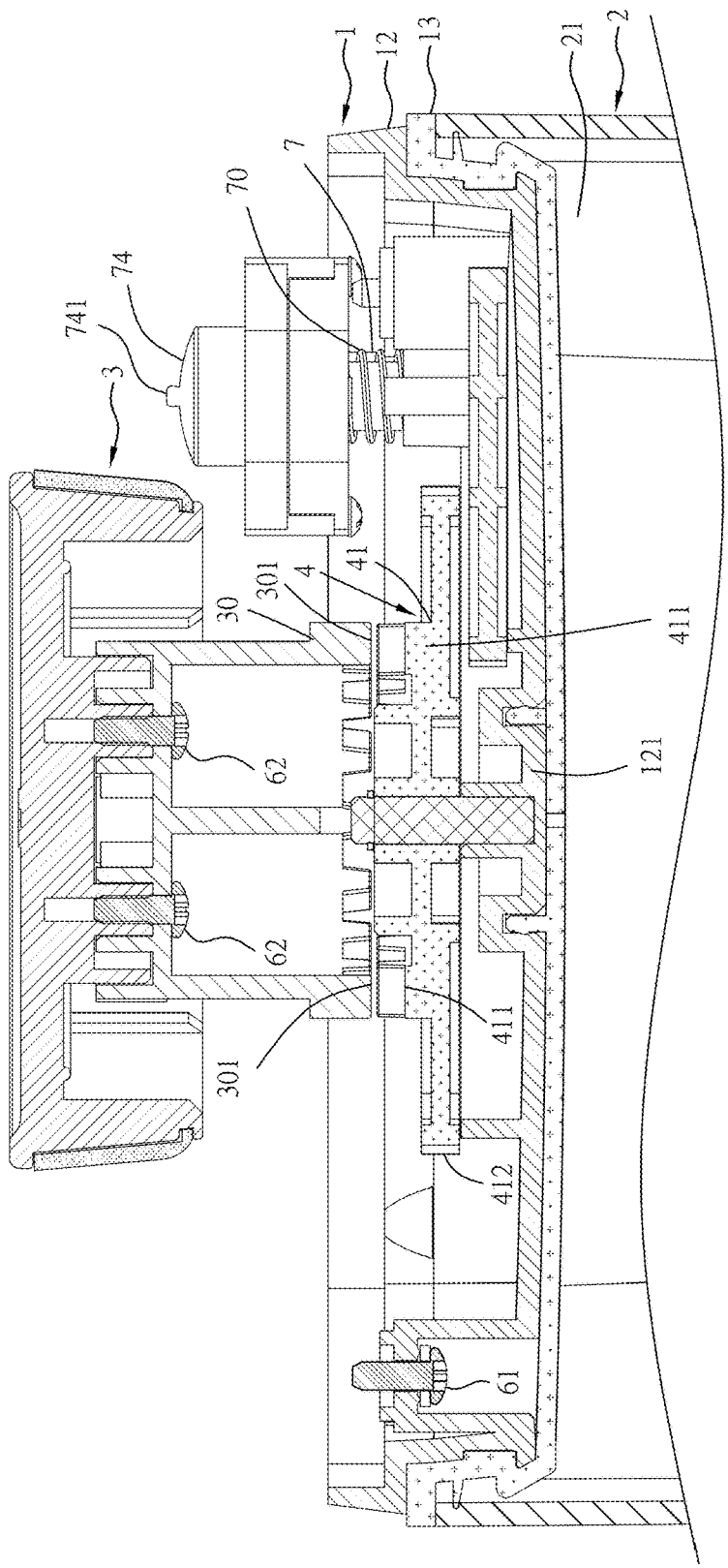
FIG. 7 corresponds to FIG. 6, illustrating the bottom wall of the inner cover member curved toward the inside of the container body upon creation of a negative pressure in the container body.

The rotary device 3 in this first embodiment is a rotary knob rotatably connected to the outer cover member 11 of the container cover 1, having an inner shaft 30 fixedly fastened to a bottom end thereof by second fastening members 62 (see FIG. 6 and FIG. 7). The inner shaft 30 has a gear portion 301 located at a distal end thereof and suspending inside the outer cover member 11. The gear portion 301 of the inner shaft 30 is adapted for driving the gear transmission mechanism 4.

The gear transmission mechanism 4 is mounted at the bottom wall 121 of the inner cover member 12 of the container cover 1, comprising a transmission gear set 41, an eccentric wheel 42 and a link 43. The transmission gear set 41 comprises a driving gear 411 meshed with the gear portion 301 of the inner shaft 30 of the rotary device (rotary knob) 3 so that rotating the rotary device (rotary knob) 3 drives the transmission gear set 41 to rotate the eccentric wheel 42. The eccentric wheel 42 is eccentrically and pivotally connected to one end of the link 43. The opposite end of the link 43 is pivotally connected to the reciprocating piston 51 of the vacuum pump 5.

Figure 9:
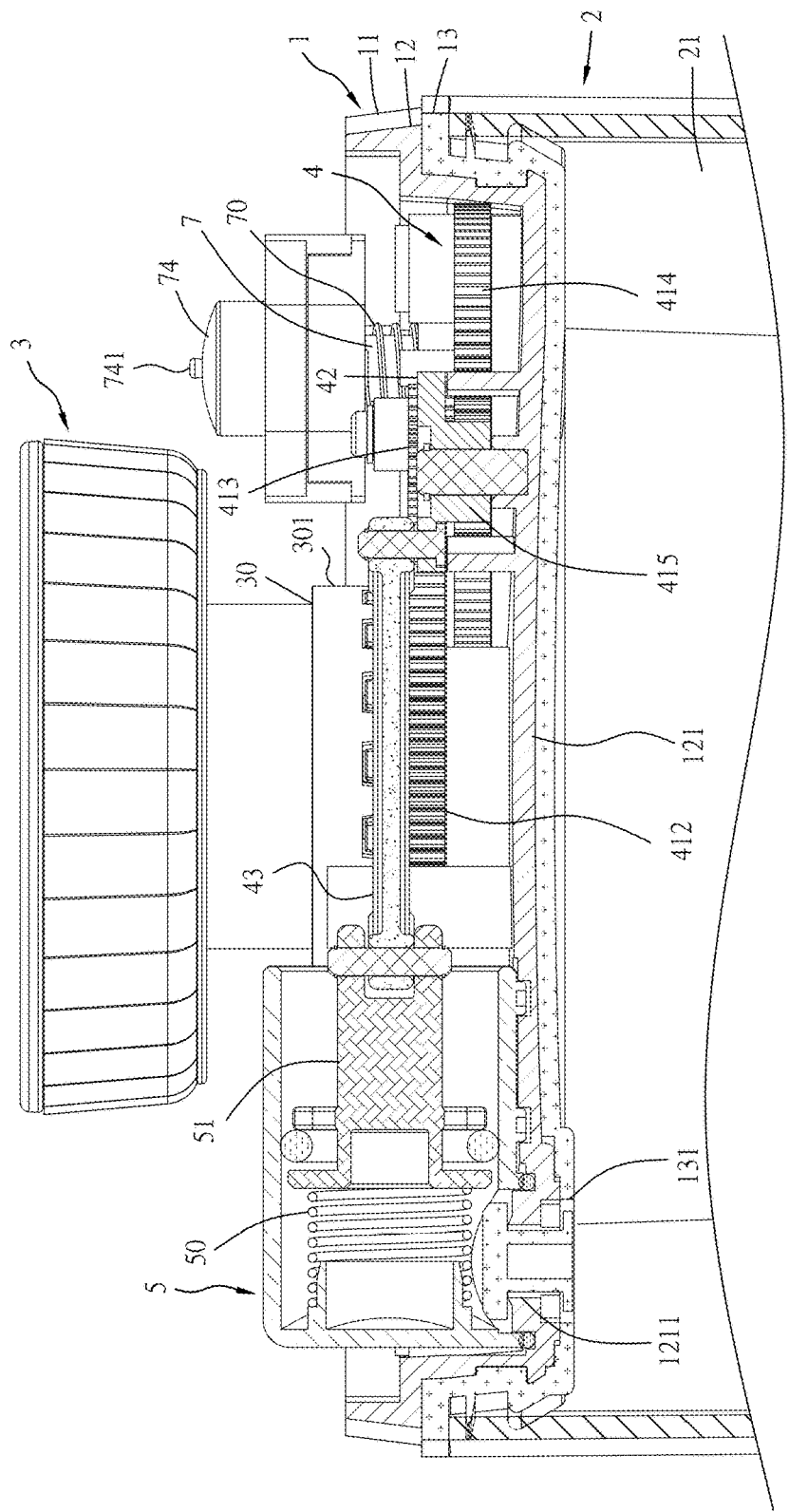
FIG. 9 is a schematic sectional view of a part of the first embodiment of the present invention, illustrating the structure of the vacuum pump.

The vacuum pump 5 is mounted at the bottom wall 121 of the inner cover member 12 of the container cover 1 and disposed in communication with the suction hole 1211 of the inner cover member 12 (see FIG. 9). The reciprocating piston 51 of the vacuum pump 5 is driven by the gear transmission mechanism 4 to reciprocate, drawing air out of the container body 2. Further, a balance spring 50 is mounted between the reciprocating piston 51 and the vacuum pump 5 (see FIG. 9) to balance the reciprocating motion of the reciprocating piston 51. In the suction action during the reciprocating motion, the load is heavy. On the contrary, in the return action during the reciprocating motion, the load is light. Subject to the arrangement of the balance spring 50, the user's hand can feel smooth when rotating the rotary device (rotary knob) 3.

Figure 8:
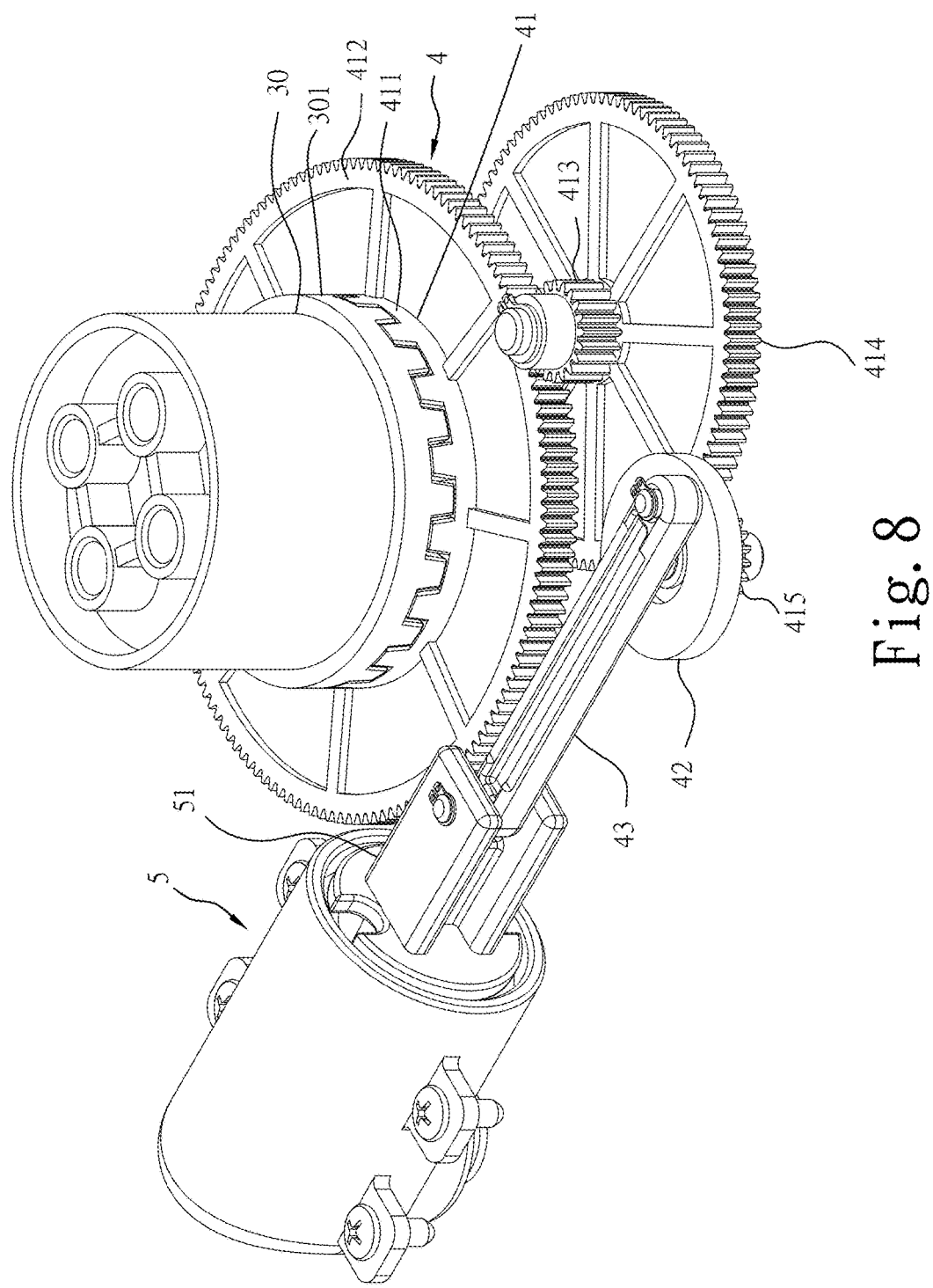
FIG. 8 is an enlarged view of a part of the first embodiment of the present invention, illustrating the relationship between the gear transmission mechanism and the vacuum pump.

As illustrated in FIG. 6 and FIG. 8, when a user rotates the rotary device (rotary knob) 3, the gear portion 301 of the inner shaft 30 is forced to drive the driving gear 411, thereby rotating the transmission gear set 41 of the gear transmission mechanism 4 (see FIG. 6 and FIG. 8). During rotation of the transmission gear set 41, the eccentric wheel 42 is driven to move the link 43, causing reciprocation of the reciprocating piston 51 to draw air out of the container body 2, and thus, a negative pressure is created in the container body 2. When the negative pressure in the container body 2 reaches a certain level, the bottom wall 121 of the plastic inner cover member 12 of the container cover 1 is forced to curve in direction toward the inside of the container body 2 (see FIG. 7), and thus, the transmission gear set 41 of the gear transmission mechanism 4 is moved with the deformed bottom wall 121 of the inner cover member 12 toward the inside of the container body 2 (see FIG. 7) to disengage the driving gear 411 from the gear portion 301 of the inner shaft 30 of the rotary device (rotary knob) 3. At this time, the rotary device (rotary knob) 3 runs idle and cannot drive the gear transmission mechanism 4 to rotate, preventing overloading the transmission gear set 41 and prolonging the service life of the gear transmission mechanism 4.

Figure 10:
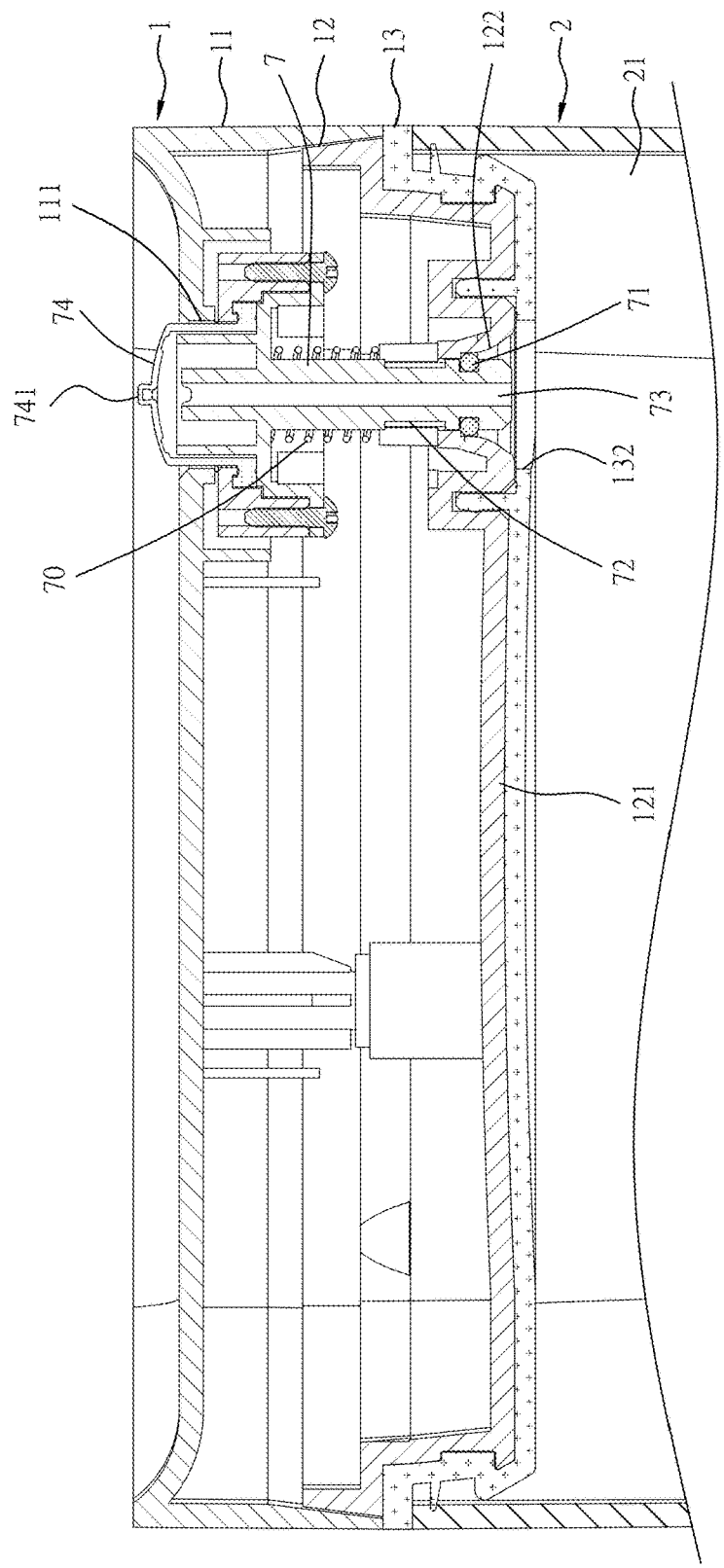
FIG. 10 is a schematic sectional view of a part of the first embodiment of the present invention, illustrating the structure of the relief valve rod.

Further, the inner cover member 12 of the container cover 1 comprises an relief channel 122 (see FIG. 10) located on the bottom wall 121 thereof; the inner plastic cushion member 13 of the container cover 1 further comprises an relief hole 132 disposed in communication with the relief channel 122 (see FIG. 1 and FIG. 10). Further, a sealing pad 71 is mounted on an relief valve rod 7 (see FIGS. 10-12) and movable with the relief valve rod 7 upwardly to block the relief channel 122 of the inner cover member 12 (see FIG. 10), or downwardly away from the relief channel 122 of the inner cover member 12 to open the passage (see FIG. 12). The relief valve rod 7 has the top end thereof inserted through a positioning hole 111 on the outer cover member 11. Further, an elastic member 70 is mounted between the relief valve rod 7 and the relief channel 122 of the inner cover member 12 to support the relief valve rod 7, holding the relief valve rod 7 in the position where the sealing pad 71 blocks the relief channel 122 of the inner cover member 2 when a negative pressure is created in the container body 2 (see FIG. 11). Further, the relief valve rod 7 comprises an external passageway 72. When the relief valve rod 7 is pressed down by an external force (see FIG. 12), the external passageway 72 reliefs gas through the gap between the sealing pad 71 and the relief channel 122 of the inner cover member 12. When the external force is released from the relief valve rod 7, the elastic member 70 immediately pushes the relief valve rod 7 upward (see FIG. 10), forcing the sealing pad 71 to block the relief channel 122. The relief valve rod 7 further comprises an internal passageway 73 cutting through the opposing top and bottom ends thereof (see FIGS. 10-12). The bottom end of the internal passageway 73 is disposed in communication with the bottom side of the relief channel 122 of the inner cover member 12.

Figure 11:
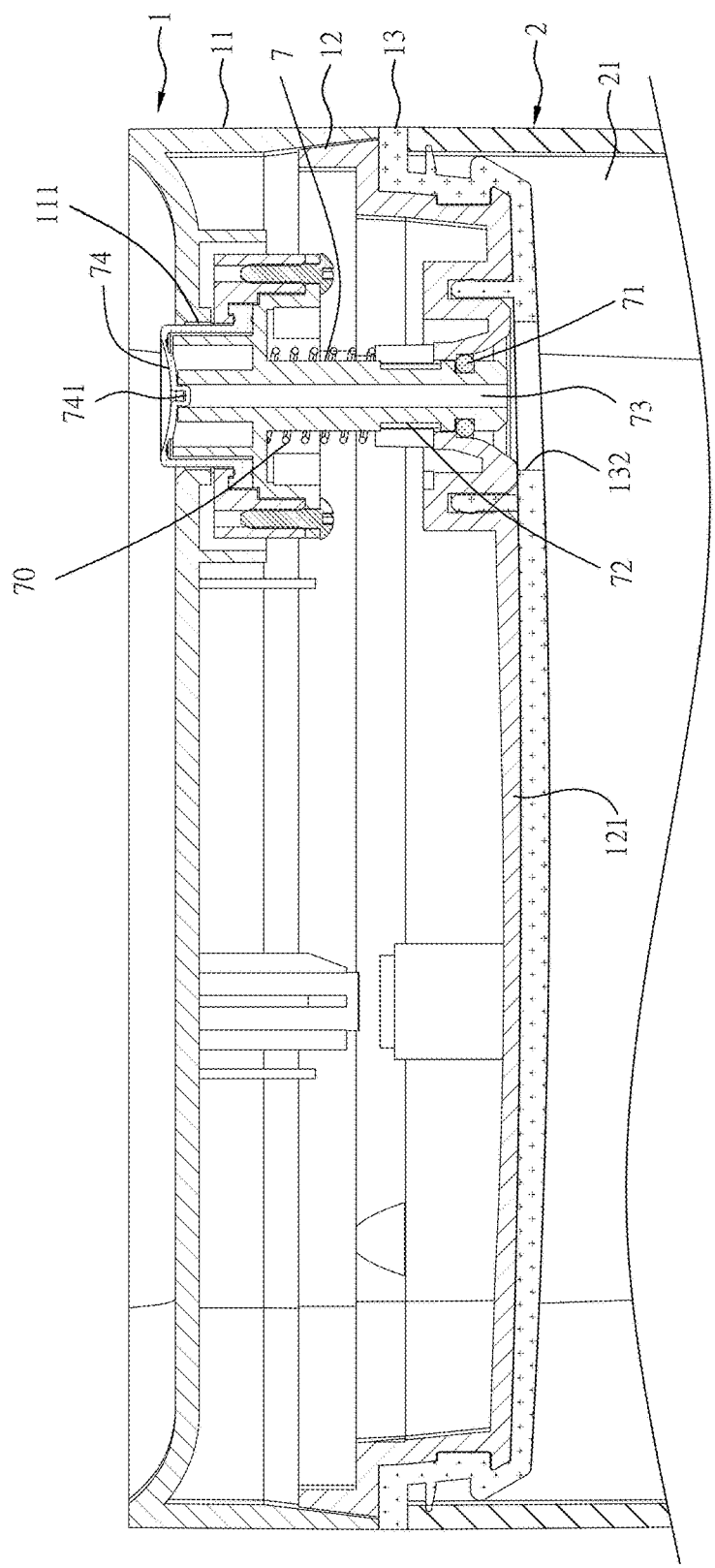
FIG. 11 corresponds to FIG. 11, illustrating a negative pressure created.
Figure 12:
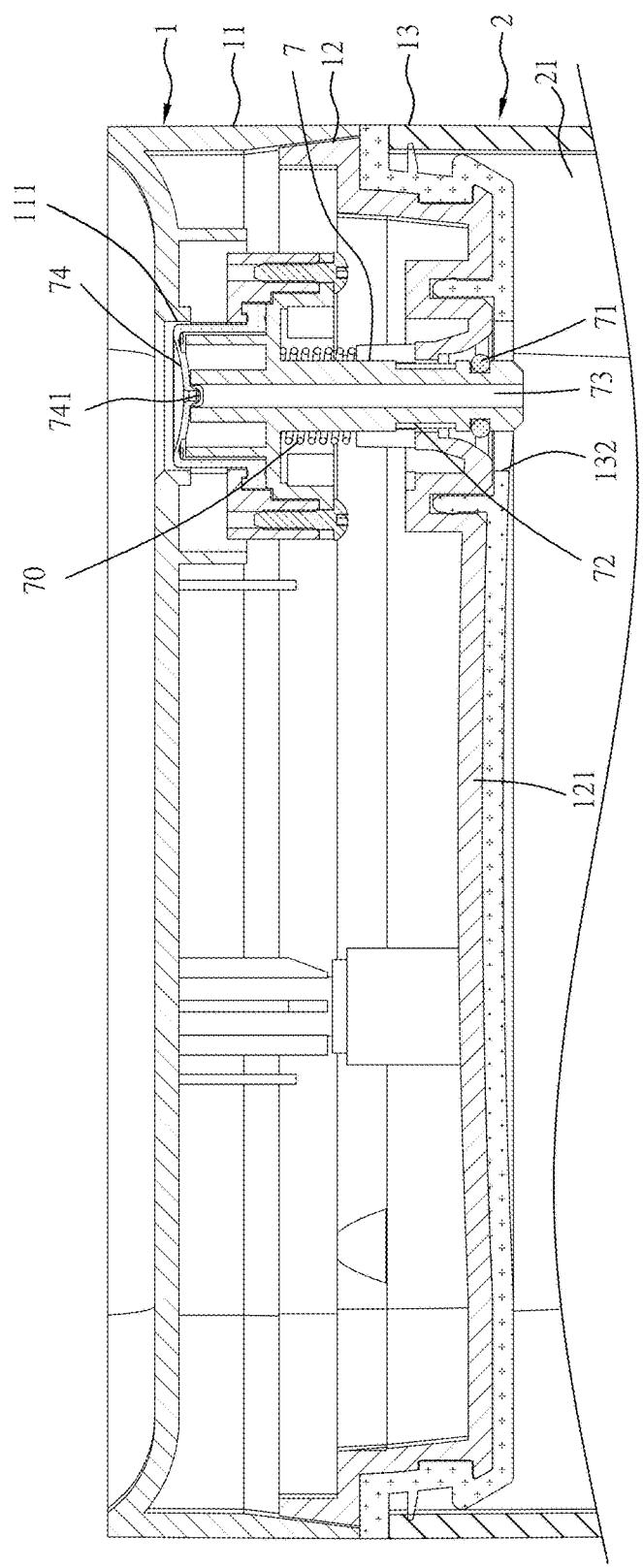
FIG. 12 corresponds to FIG. 11, illustrating the relief valve rod pressed down, the flexible end cap curved inwards.

Further, a flexible end cap 74 is fixedly mounted on the top end of the relief valve rod 7 (see FIGS. 10-12). When a negative pressure is created in the container body 2, the flexible end cap 74 is sucked by the negative pressure in the internal passageway 73 to curve inwards (see FIG. 11), exhibiting a sign indicative of the presence of a negative pressure. The flexible end cap 74 further comprises a top protruding portion 741 located at the center of the top surface thereof. The top protruding portion 741 can be made of a different material with a different color relative to the flexible end cap 74, enhancing the negative pressure identification indication effect.

Figure 13:
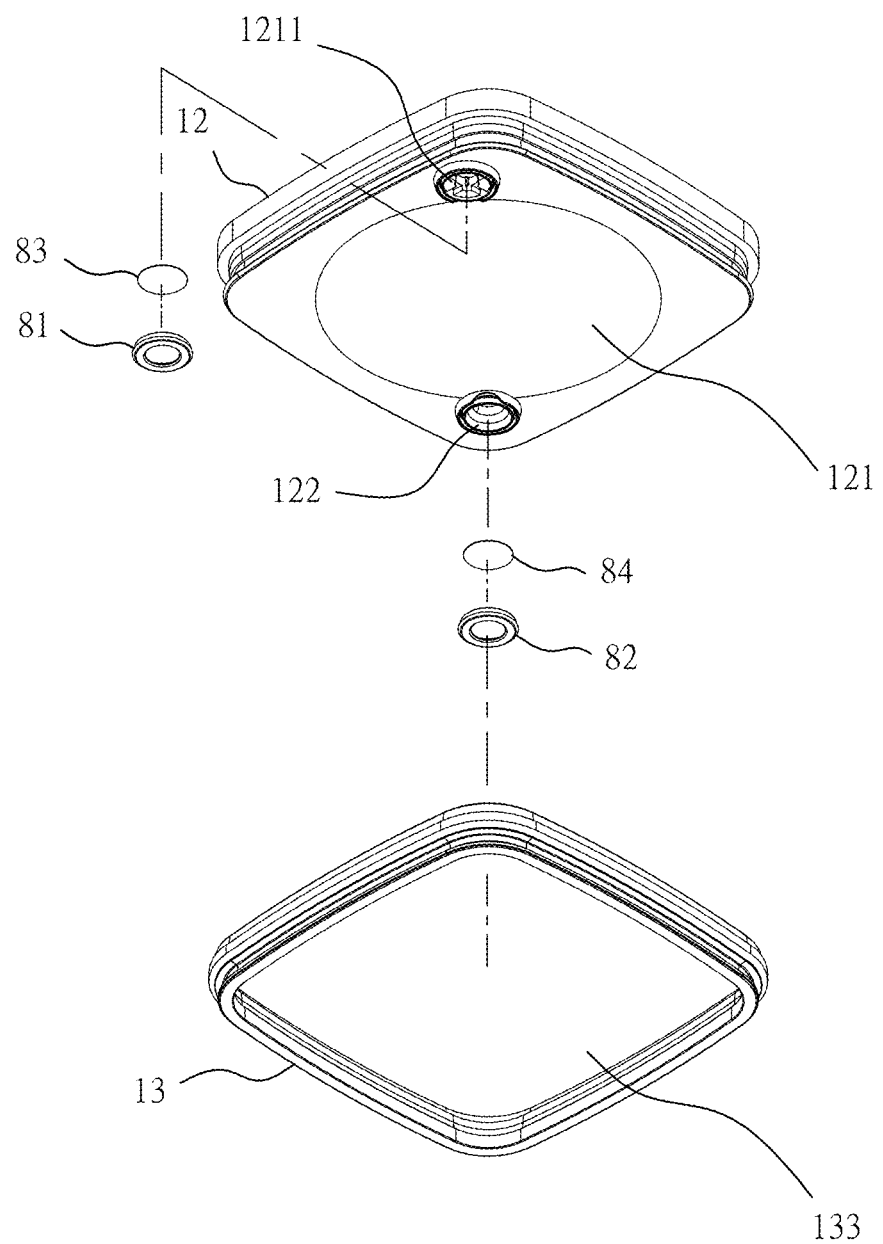
FIG. 13 is an oblique bottom exploded view of a part of the first embodiment of the present invention, illustrating the relationship between the dustproof covers and dustproof nets and the suction hole and relief channel of the inner cover member of the container cover.
Figure 14:
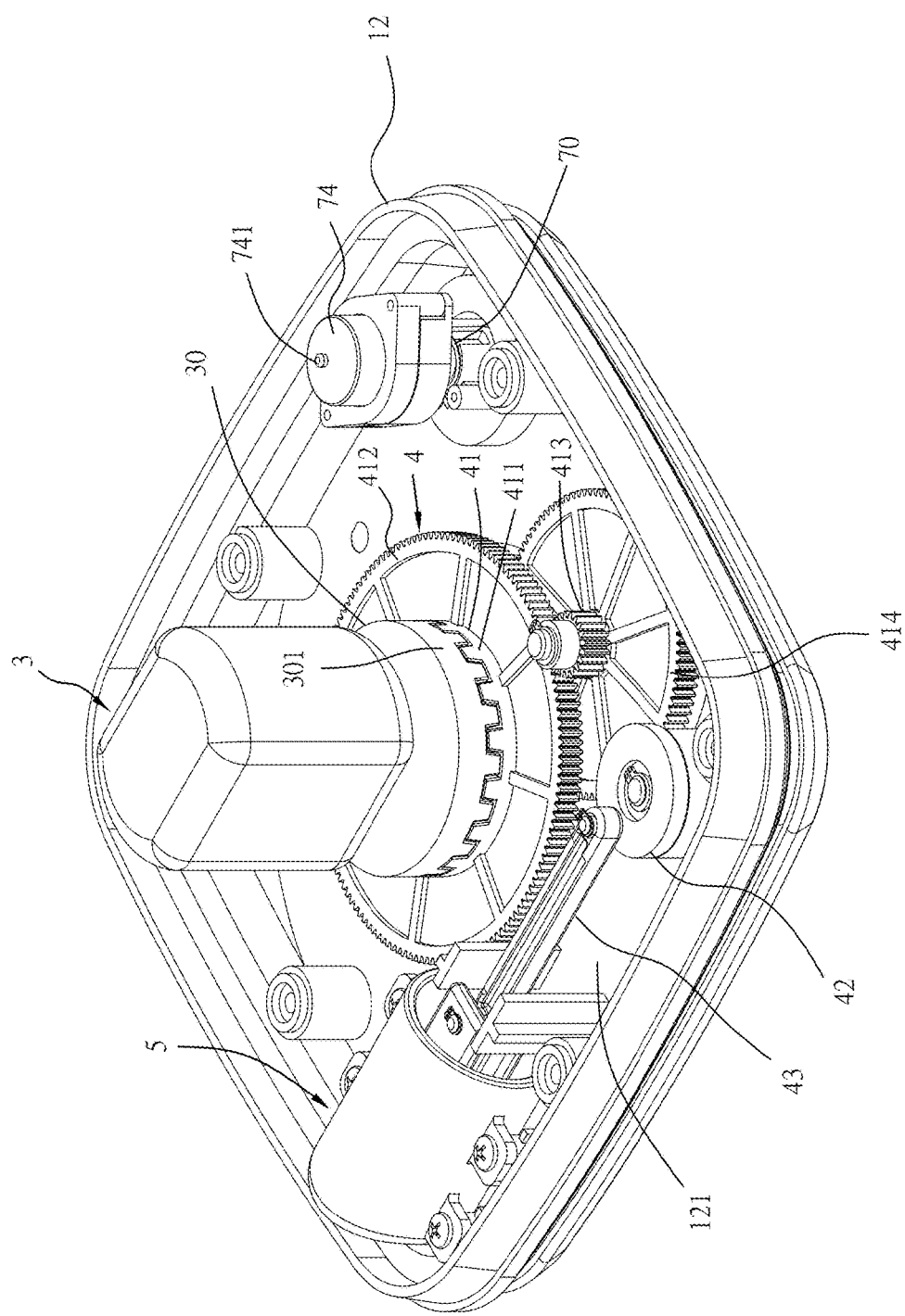
FIG. 14 is an oblique top elevational view of a part of a negative pressure storage container in accordance with a second embodiment of the present invention.
Figure 15:
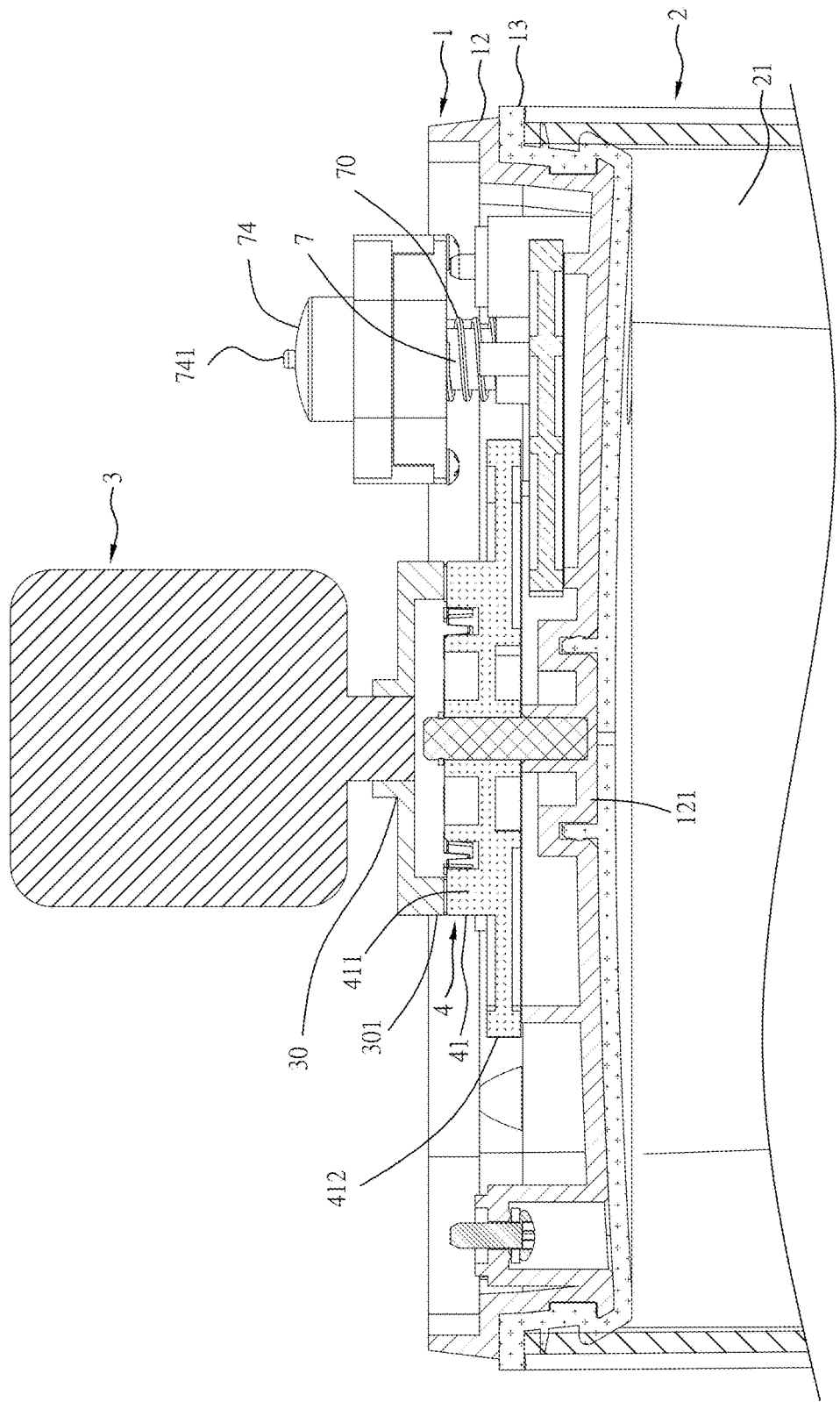
FIG. 15 is a schematic sectional assembly view of the negative pressure storage container in accordance with the second embodiment of the present invention.

Further, as illustrated in FIG. 13, the suction hole 1211 and relief channel 122 on the bottom wall 121 of the inner cover member 12 of the container cover 1 are respectively mounted with respective dustproof covers 81,82 and respective dustproof nets 83,84, preventing powder ingredients in the container body 2 from affecting the airtight effect or product service life. Further, the dustproof covers 81,82 and the dustproof nets 83,84 are detachable, facilitating washing or replacement. Further, in order to facilitate the mounting and dismounting of the dustproof covers 81,82 and dustproof nets 83,84, the inner plastic cushion member 13 is configured to provide an opening 133.

Further, in this embodiment, the gear portion 301 of the inner shaft 30 at the rotary device (rotary knob) 3 is meshed with the driving gear 411 of the transmission gear set 41 of the gear transmission mechanism 4. The transmission gear set 41 further comprises a large gear 412 coaxially mounted at a bottom side of the driving gear 411, a first small gear 413 meshed with the large gear 412, an intermediate gear 414 coaxially connected to the first small gear 413, and a second small gear 415 meshed with the intermediate gear 414. The aforesaid eccentric wheel 42 is coaxially connected to the second small gear 415 and pivotally coupled to the one end of the link 43 in an eccentric manner. The other end of the link 43 is pivotally coupled to the reciprocating piston 51. Thus, when the rotary device (rotary knob) 3 is being rotated, the gear portion 301 of the inner shaft 30 is driven to rotate the driving gear 411 and the large gear 412, causing the large gear 412 to rotate the first small gear 413 and the intermediate gear 414, and the second small gear 415 is then driven by the intermediate gear 414 to rotate the eccentric wheel 42, driving the link 43 to reciprocate the reciprocating piston 51.

Referring to FIGS. 14-18, a negative pressure storage container in accordance with a second embodiment of the present invention is shown. In this second embodiment, a motor module is used to substitute for the rotary device 3 in the aforesaid first embodiment. The other technical features of this second embodiment are substantially same as the aforesaid first embodiment. The negative pressure storage container of this second embodiment comprises a container cover 1, a container body 2, a rotary device 3, a gear transmission mechanism 4, and a vacuum pump 5.

The container body 2 defines therein a storage chamber with an open side 21 for storing foods, having a bottom surface thereof mounted with an anti-slip pad 22.

The container cover 1 covers the container body 2 (see FIGS. 15-17), comprising an outer cover member 11, an inner cover member 12 and an inner plastic cushion member 13. The outer cover member 11 and the inner cover member 12 are fastened together. The inner cover member 12 is made of a plastic material, having a top side thereof fastened to the outer cover member 11 and an opposing bottom side thereof fastened to the inner plastic cushion member 13. Further, the inner cover member 12 has a suction hole 1211 located on a bottom wall 121 thereof (see FIG. 17). The inner plastic cushion member 13 has a suction through hole 131 (see FIG. 17) corresponding to the suction hole 1211. After covered the container cover 1 on the container body 2, the suction hole 1211 is kept in communication with the inside space of the container body 2.

Figure 18:
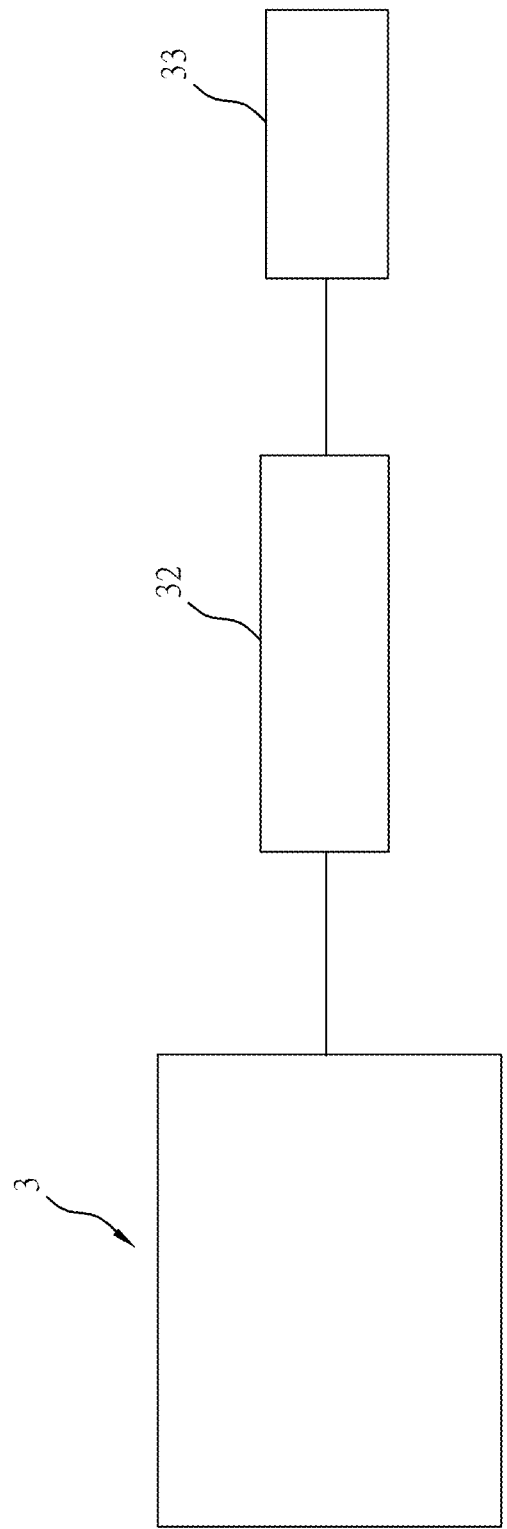
FIG. 18 is a block diagram of the motor module, power supply module and switch control module of the negative pressure storage container in accordance with a second embodiment of the present invention.

The rotary device 3 in this second embodiment is a motor module, having an inner shaft 30 coupled thereto. The inner shaft 30 has a gear portion 301 located at a distal end thereof and suspending inside the outer cover member 11. The gear portion 301 of the inner shaft 30 is adapted for driving the gear transmission mechanism 4. As illustrated in FIG. 18, the rotary device (motor module) 3 is electrically coupled to a power supply module 32 (for example, battery set). The power supply module 32 is electrically coupled to a switch control module 33 that controls on/off of the rotary device (motor module) 3.

The gear transmission mechanism 4 is mounted at the bottom wall 121 of the inner cover member 12 of the container cover 1, comprising a transmission gear set 41, an eccentric wheel 42 and a link 43. The transmission gear set 41 comprises a driving gear 411 meshed with the gear portion 301 of the inner shaft 30 of the rotary device (motor module) 3 so that rotating the rotary device (motor module) 3 drives the transmission gear set 41 to rotate the eccentric wheel 42. The eccentric wheel 42 is eccentrically and pivotally connected to one end of the link 43. The opposite end of the link 43 is pivotally connected to the reciprocating piston 51 of the vacuum pump 5.

Figure 17:
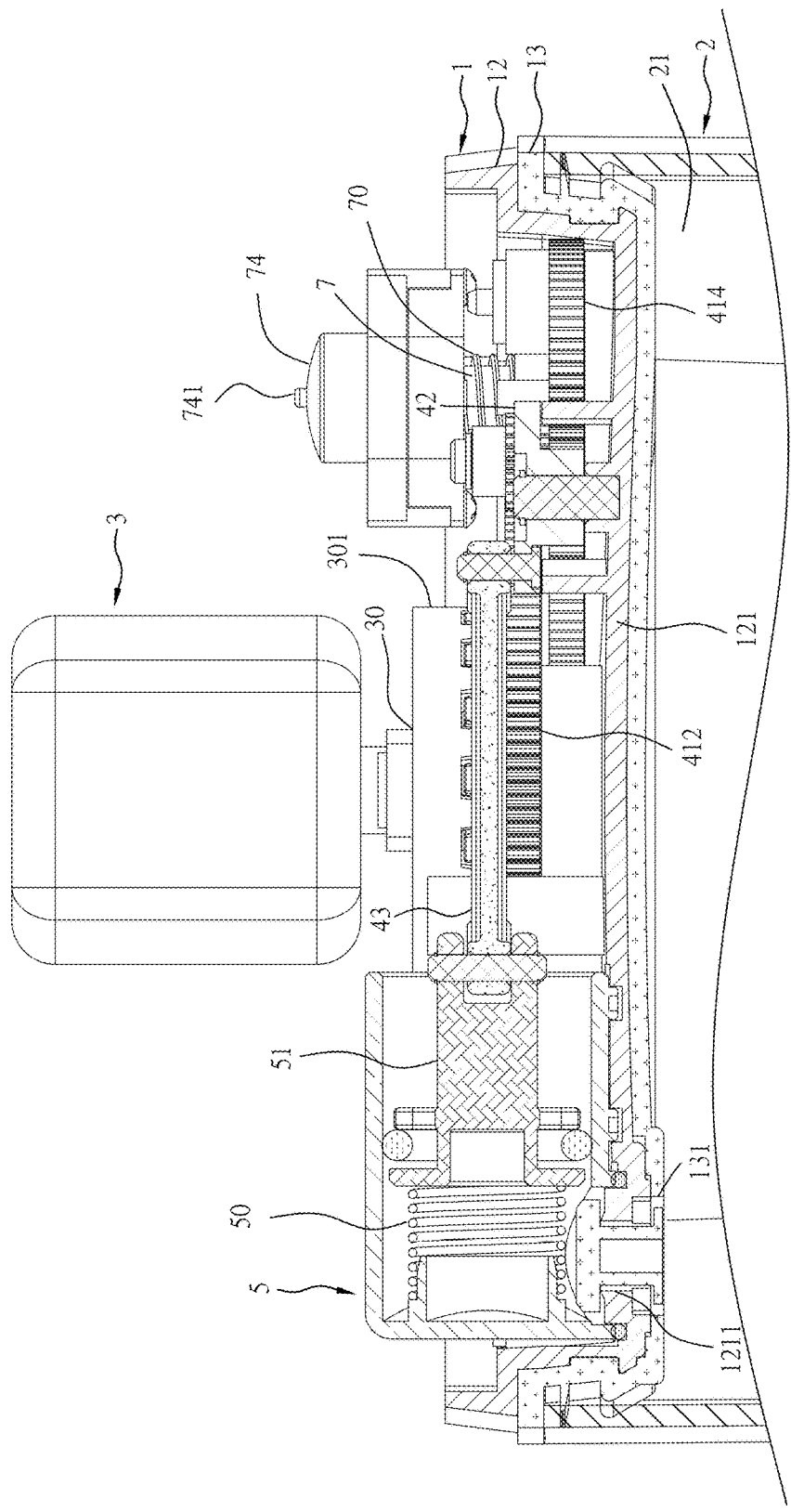
FIG. 17 is a schematic sectional view of the second embodiment of the present invention, illustrating the structure of the vacuum pump and the surrounding component parts.

The vacuum pump 5 is mounted at the bottom wall 121 of the inner cover member 12 of the container cover 1 and disposed in communication with the suction hole 1211 of the inner cover member 12 (see FIG. 17). The reciprocating piston 51 of the vacuum pump 5 is driven by the gear transmission mechanism 4 to reciprocate, drawing air out of the container body 2. Further, a balance spring 50 is mounted between the reciprocating piston 51 and the vacuum pump 5 (see FIG. 17) to balance the reciprocating motion of the reciprocating piston 51. In the suction action during the reciprocating motion, the load is heavy. On the contrary, in the return action during the reciprocating motion, the load is light. Subject to the arrangement of the balance spring 50, the user's hand can feel smooth when rotating the rotary device (rotary knob) 3.

When the rotary device (motor module) 3 is started up, the gear portion 301 of the inner shaft 30 is forced to drive the driving gear 411, thereby rotating the transmission gear set 41 of the gear transmission mechanism 4. During rotation of the transmission gear set 41, the eccentric wheel 42 is driven to move the link 43, causing reciprocation of the reciprocating piston 51 to draw air out of the container body 2, and thus, a negative pressure is created in the container body 2. When the negative pressure in the container body 2 reaches a certain level, the bottom wall 121 of the plastic inner cover member 12 of the container cover 1 is forced to curve in direction toward the inside of the container body 2, and thus, the transmission gear set 41 of the gear transmission mechanism 4 is moved with the deformed bottom wall 121 of the inner cover member 12 toward the inside of the container body 2 to disengage the driving gear 411 from the gear portion 301 of the inner shaft 30 of the rotary device (motor module) 3. At this time, the rotary device (motor module) 3 runs idle and cannot drive the gear transmission mechanism 4 to rotate, preventing overloading the transmission gear set 41 and prolonging the service life of the gear transmission mechanism 4.

Figure 16:
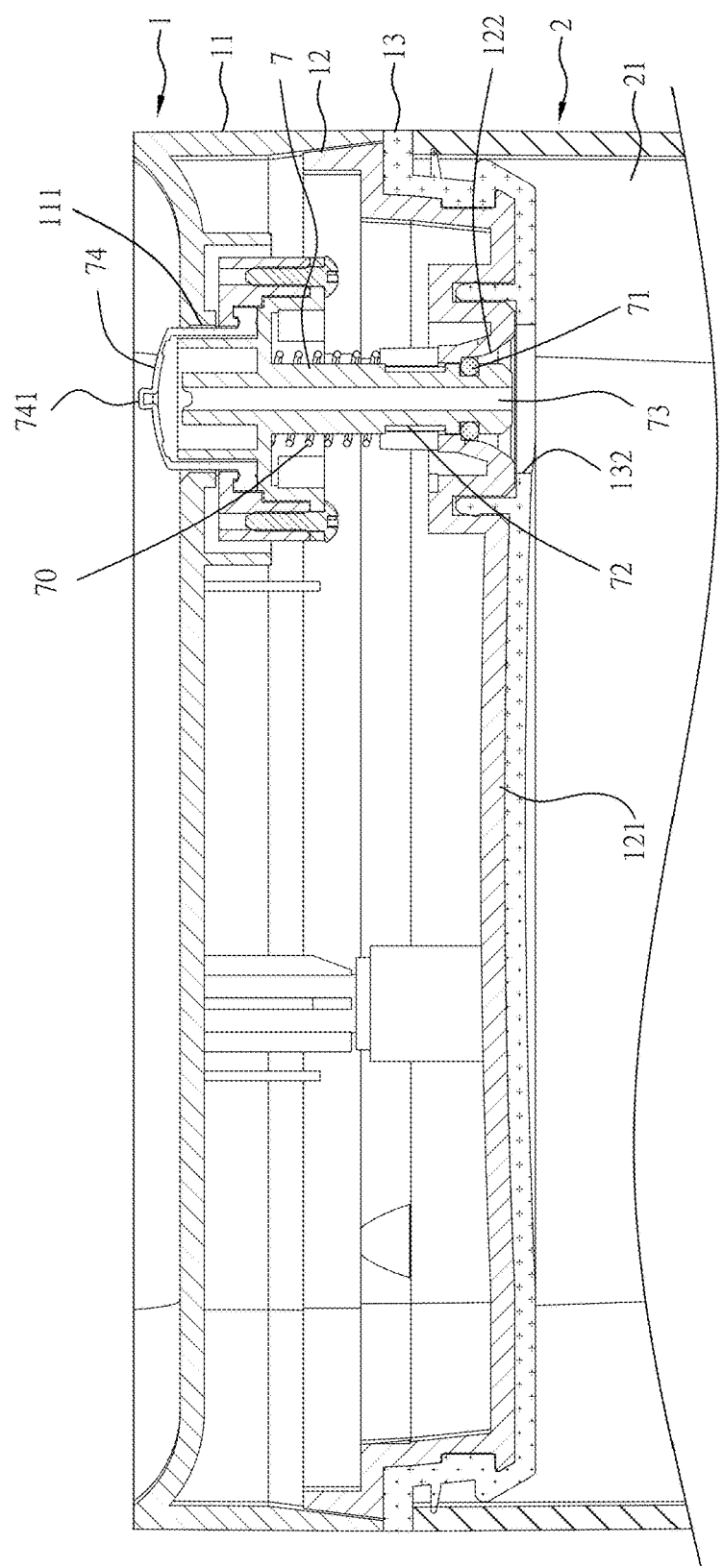
FIG. 16 is a schematic sectional view of the second embodiment of the present invention, illustrating the structure of the relief valve rod.

Further, as illustrated in FIG. 16, the inner cover member 12 of the container cover 1 comprises an relief channel 122 located on the bottom wall 121 thereof; the inner plastic cushion member 13 of the container cover 1 further comprises an relief hole 132 disposed in communication with the relief channel 122. Further, a sealing pad 71 is mounted on an relief valve rod 7 and movable with the relief valve rod 7 upwardly to block the relief channel 122 of the inner cover member 12, or downwardly away from the relief channel 122 of the inner cover member 12 to open the passage. The relief valve rod 7 has the top end thereof inserted through a positioning hole 111 on the outer cover member 11. Further, an elastic member 70 is mounted between the relief valve rod 7 and the relief channel 122 of the inner cover member 12 to support the relief valve rod 7, holding the relief valve rod 7 in the position where the sealing pad 71 blocks the relief channel 122 of the inner cover member 2 when a negative pressure is created in the container body 2. Further, the relief valve rod 7 comprises an external passageway 72. When the relief valve rod 7 is pressed down by an external force, gas is reliefed from the external passageway 72 through the gap between the sealing pad 71 and the relief channel 122 of the inner cover member 12. When the external force is released from the relief valve rod 7, the elastic member 70 immediately pushes the relief valve rod 7 upward, forcing the sealing pad 71 to block the relief channel 122. The relief valve rod 7 further comprises an internal passageway 73 cutting through the opposing top and bottom ends thereof. The bottom end of the internal passageway 73 is disposed in communication with the bottom side of the relief channel 122 of the inner cover member 12. Further, a flexible end cap 74 is fixedly mounted on the top end of the relief valve rod 7. When a negative pressure is created in the container body 2, the flexible end cap 74 is sucked by the negative pressure in the internal passageway 73 to curve inwards, exhibiting a sign indicative of the presence of a negative pressure. The flexible end cap 74 further comprises a top protruding portion 741 located at the center of the top surface thereof. The top protruding portion 741 can be made of a different material with a different color relative to the flexible end cap 74, enhancing the negative pressure identification indication effect.

In conclusion, the invention has the features and effects as follows:

1. When the negative pressure created in the container body 2 reaches a certain level, the bottom wall 121 of the plastic inner cover member 12 of the container cover 1 is forced to curve in direction toward the inside of the container body 2 (see FIG. 7), and thus, the transmission gear set 41 of the gear transmission mechanism 4 is moved with the deformed bottom wall 121 of the inner cover member 12 toward the inside of the container body 2 (see FIG. 7) to disengage the driving gear 411 from the gear portion 301 of the inner shaft 30 of the rotary device (rotary knob) 3; at this time, the rotary device (rotary knob) 3 runs idle and cannot drive the gear transmission mechanism 4 to rotate, preventing overloading the transmission gear set 41 and prolonging the service life of the gear transmission mechanism 4.

2. When a certain level of negative pressure is created in the container body 2, the storage food ingredients and eatable items in the container body 2 can be maintained fresh.

3. The relief valve rod 7 comprises an internal passageway 73 cutting through the opposing top and bottom ends thereof with a bottom end thereof disposed in communication with the bottom side of the relief channel 122 of the inner cover member 12 and a top end thereof fixedly mounted with a flexible end cap 74, thus, when a negative pressure is created in the container body 2, the flexible end cap 74 is sucked by the negative pressure in the internal passageway 73 to curve inwards, exhibiting a sign indicative of the presence of a negative pressure; the flexible end cap 74 further comprises a top protruding portion 741 located at the center of the top surface thereof and made of a different material with a different color relative to the flexible end cap 74, enhancing the negative pressure identification indication effect.

What is claimed is:

1. A negative pressure storage container, comprising:

a container body comprising a storage chamber with an open side and an anti-slip pad mounted on a bottom surface thereof;

a container cover covering said container body, said container cover comprising an outer cover member, an inner cover member and an inner plastic cushion member, said outer cover member and said inner cover member being fastened together, said inner cover member being made of a plastic material and having a top side thereof fastened to said outer cover member and an opposing bottom side thereof fastened to said inner plastic cushion member, said inner cover member comprising a suction hole located on a bottom wall thereof, said inner plastic cushion member comprising a suction through hole, which is disposed in communication with the inside space of said container body after said container cover is covered on said container body;

a rotary device rotatably connected to said outer cover member of said container cover, said rotary device comprising an inner shaft fixedly fastened to a bottom end thereof and a gear portion located at a distal end of said inner shaft and suspending inside said outer cover member and adapted for driving a gear transmission mechanism;

a gear transmission mechanism mounted at said bottom wall of said inner cover member of said container cover, said gear transmission mechanism comprising a transmission gear set, an eccentric wheel and a link, said transmission gear set comprises a driving gear meshed with said gear portion of said inner shaft of said rotary device and drivable by said rotary device to rotate said eccentric wheel, said eccentric wheel being eccentrically and pivotally connected to one end of said link, said link having an opposite end thereof pivotally connected to a reciprocating piston of a vacuum pump;

a vacuum pump mounted at said bottom wall of said inner cover member of said container cover and disposed in communication with said suction hole of said inner cover member, said vacuum pump comprising a reciprocating piston drivable by said gear transmission mechanism to reciprocate and to further draw air out of said container body; and a balance spring mounted between said reciprocating piston and said vacuum pump;

wherein when said rotary device is rotated by an external force, said gear portion of said inner shaft is forced to rotate said driving gear and then said transmission gear set of said gear transmission mechanism, causing said eccentric wheel to move said link and to further reciprocate said reciprocating piston in drawing air out of said container body, and thus, a negative pressure is created in said container body; when the negative pressure in said container body reaches a predetermined level, said bottom wall of said plastic inner cover member of said container cover is forced to curve in direction toward the inside of said container body, and thus, said transmission gear set of said gear transmission mechanism is moved with the deformed said bottom wall of said inner cover member toward the inside of said container body to disengage said driving gear from said gear portion of said inner shaft of said rotary device, enabling said rotary device to run idle.

2. The negative pressure storage container as claimed in claim 1, wherein said inner cover member comprising a suction hole and a relief channel respectively located on a bottom wall thereof, said inner plastic cushion member comprising a suction through hole, which is disposed in communication with the inside space of said container body after said container cover is covered on said container body; and a relief hole for communication with said relief channel, and said outer cover member comprises a positioning hole; said relief valve rod has an opposing top end thereof upwardly inserted through said positioning hole of said outer cover member; said container cover further comprises an elastic member mounted between said relief valve rod and said relief channel of said inner cover member to support said relief valve rod in the position where said sealing pad seals said relief channel of said inner cover member upon creation of a negative pressure in said container body; said relief valve rod comprises an external passageway so arranged that when said relief valve rod is pressed down by an external force, said external passageway relieves gas through the gap between said sealing pad and said relief channel of said inner cover member and, when the external force is released from said relief valve rod, said elastic member immediately pushes said relief valve rod upward, forcing said sealing pad to seal said relief channel; said relief valve rod further comprises an internal passageway cutting through the opposing top and bottom ends thereof, said internal passageway having a bottom end thereof disposed in communication with a bottom side of said relief channel of said inner cover member and a top end thereof fixedly mounted with a flexible end cap, said flexible end cap being so configured that when a negative pressure is created in said container body, said flexible end cap is sucked by said negative pressure to curve inwards, exhibiting a sign indicative of the presence of said negative pressure.

3. The negative pressure storage container as claimed in claim 2, wherein said flexible end cap comprises a top protruding portion located at the center of a top surface thereof.

4. The negative pressure storage container as claimed in claim 1, wherein said rotary device comprises a rotary knob rotatably mounted in said outer cover member of said container cover and fixedly connected with said inner shaft.

5. The negative pressure storage container as claimed in claim 1, wherein said rotary device comprises a motor module coupled with said inner shaft, a power supply module electrically coupled to said motor module, and a switch control module electrically coupled to said power supply module for controlling on/off of said motor module.

6. A negative pressure storage container, comprising:
a container body comprising a storage chamber with an open side and an anti-slip pad mounted on a bottom surface thereof;
a container cover covering said container body, said container cover comprising an outer cover member, an inner cover member and an inner plastic cushion member, said outer cover member and said inner cover member being fastened together, said inner cover member being made of a plastic material and having a top side thereof fastened to said outer cover member and an opposing bottom side thereof fastened to said inner plastic cushion member, said inner cover member comprising a suction hole and a relief channel respectively located on a bottom wall thereof, said inner plastic cushion member comprising a suction through hole, which is disposed in communication with the inside space of said container body after said container cover is covered on said container body, and a relief hole for communication with said relief channel;
a relief valve rod having a sealing pad located at a bottom end thereof, said relief valve rod being mounted in said outer cover member and movable relative to said outer cover member being a closed position where said sealing pad seals said relief channel and an open position where said sealing pad is moved away from said relief channel for allowing communication between said relief channel and said relief hole;
a rotary device comprising an inner shaft, and a gear portion located at a distal end of said inner shaft and suspending inside said outer cover member and adapted for driving a gear transmission mechanism;
a gear transmission mechanism mounted at said bottom wall of said inner cover member of said container cover, said gear transmission mechanism comprising a transmission gear set, an eccentric wheel and a link, said transmission gear set comprises a driving gear meshed with said gear portion of said inner shaft of said rotary device and drivable by said rotary device to rotate said eccentric wheel, said eccentric wheel being eccentrically and pivotally connected to one end of said link, said link having an opposite end thereof pivotally connected to a reciprocating piston of a vacuum pump;
a vacuum pump mounted at said bottom wall of said inner cover member of said container cover and disposed in communication with said suction hole of said inner cover member, said vacuum pump comprising a reciprocating piston drivable by said gear transmission mechanism to reciprocate and to further draw air out of said container body; and
a balance spring mounted between said reciprocating piston and said vacuum pump;
wherein when said rotary device is rotated by an external force, said gear portion of said inner shaft is forced to rotate said driving gear and then said transmission gear set of said gear transmission mechanism, causing said eccentric wheel to move said link and to further reciprocate said reciprocating piston in drawing air out of said container body, and thus, a negative pressure is created in said container body; when the negative pressure in said container body reaches a predetermined level, said bottom wall of said plastic inner cover member of said container cover is forced to curve in direction toward the inside of said container body, and thus, said transmission gear set of said gear transmission mechanism is moved with the deformed said bottom wall of said inner cover member toward the inside of said container body to disengage said driving gear from said gear portion of said inner shaft of said rotary device, enabling said rotary device to run idle.

7. The negative pressure storage container as claimed in claim 6, wherein said outer cover member comprises a positioning hole; said relief valve rod has an opposing top end thereof upwardly inserted through said positioning hole of said outer cover member; said container cover further comprises an elastic member mounted between said relief valve rod and said relief channel of said inner cover member to support said relief valve rod in the position where said sealing pad seals said relief channel of said inner cover member upon creation of a negative pressure in said container body; said relief valve rod comprises an external passageway so arranged that when said relief valve rod is pressed down by an external force, said external passageway relieves gas through the gap between said sealing pad and said relief channel of said inner cover member and, when the external force is released from said relief valve rod, said elastic member immediately pushes said relief valve rod upward, forcing said sealing pad to seal said relief channel; said relief valve rod further comprises an internal passageway cutting through the opposing top and bottom ends thereof, said internal passageway having a bottom end thereof disposed in communication with a bottom side of said relief channel of said inner cover member and a top end thereof fixedly mounted with a flexible end cap, said flexible end cap being so configured that when a negative pressure is created in said container body, said flexible end cap is sucked by said negative pressure to curve inwards, exhibiting a sign indicative of the presence of said negative pressure.

8. The negative pressure storage container as claimed in claim 7, wherein said flexible end cap comprises a top protruding portion located at the center of a top surface thereof.

9. The negative pressure storage container as claimed in claim 6, wherein said rotary device comprises a rotary knob rotatably mounted in said outer cover member of said container cover and fixedly connected with said inner shaft.

10. The negative pressure storage container as claimed in claim 6, wherein said rotary device comprises a motor module coupled with said inner shaft, a power supply module electrically coupled to said motor module, and a switch control module electrically coupled to said power supply module for controlling on/off of said motor module.

11. The negative pressure storage container as claimed in claim 6, wherein said transmission gear set further comprises a large gear coaxially mounted at a bottom side of said driving gear, a first small gear meshed with said large gear, an intermediate gear coaxially connected to said first small gear, and a second small gear meshed with said intermediate gear; said eccentric wheel is coaxially connected to said second small gear and pivotally coupled to the one end of said link in an eccentric manner, said link has the opposite end thereof pivotally coupled to said reciprocating piston, and thus, when said rotary device is being rotated, said gear portion of said inner shaft is driven to rotate said driving gear and said large gear, causing said large gear to rotate said first small gear and said intermediate gear, and said second small gear is then driven by said intermediate gear to rotate said eccentric wheel, driving said link to reciprocate said reciprocating piston.

* * * * *